Patented June 8, 1948

2,443,015

UNITED STATES PATENT OFFICE 2,443,015

HYDROGENATED POLYALKYLATED PHENOL

Arthur C. Whitaker, Oakmont, Pa., and William W. Weinrich, Bartlesville, Okla., assignors to Gulf Research & Development Company, Pittsburgh, Pa., a corporation of Delaware No Drawing. Application April 19, 1946, Serial No. 663,624

3 Claims. (Cl. 260—586)

The present invention relates to a new compound, namely 2,4,6-tri-tertiary-butyl cyclohexanone, and to a method of preparing the same.

The primary object of the present invention is to produce the aforesaid compound.

In accordance with our invention, a new compound, namely, 2,4,6-tri-tertiary-butyl cyclohexanone, is prepared by hydrogenating 2,4,6-tri-tertiary-butyl phenol at elevated temperatures and pressures and in the presence of a hydrogenation catalyst, until the phenol has absorbed 4 atoms of combined hydrogen per molecule.

In practicing our invention, 2,4,6-tri-tertiary-butyl phenol is subjected to the action of hydrogen at pressures of from 1600 to 2500 pounds per square inch in the presence of a relatively small amount of a hydrogenation catalyst, such as Raney or other form of nickel, platinum or palladium, and at temperatures between 160° and 250° C.

The operation can be carried out either continuously or in a batch manner, the latter being preferred. In carrying out our process in a batch, the phenol is placed in a suitable pressure resisting container, such as a rocking pressure bomb, in the presence of from 8 to 11 per cent of catalyst, and in the presence of sufficient hydrogen to maintain a pressure of 1400 pounds per square inch. The bomb is then sealed and heated to an initial reaction temperature of about 175° C. or until the hydrogen pressure approximates 2100 pounds per square inch. Heating is then continued until the temperature has reached approximately 230° C. and the pressure in the bomb has substantially decreased, thus indicating completion of the reaction. The bomb is then allowed to cool, after which its contents are removed and filtered to separate the catalyst from the hydrogenated product, which may then be further purified by rectification, sublimation or recrystallization, or other suitable method, to purify it and separate it from the initial starting material.

When the hydrogenation is carried out as aforesaid, destructive hydrogenation is avoided, the reaction being limited to absorption of hydrogen. In other words, the hydrogenation is not carried on to yield a hydrocarbon nor are the rings opened nor any groups removed.

It will be understood that the pressure and temperature are necessarily interdependent to a considerable degree and that the higher the operating pressure the lower will be the temperature required to effect hydrogenation, within the limits stated. While the initial pressure is not as important as the pressure during the reaction period, it must be high enough to insure that there will be sufficient hydrogen present to complete the desired hydrogenation reaction, and to provide a moderate excess of hydrogen over that actually absorbed in the reaction.

Example 60 parts of 2,4,6-tri-tertiary-butyl phenol, 6 parts of Raney nickel catalyst, and 1360 pounds per square inch of hydrogen were charged to a rocking bomb. The bomb was electrically heated for a period of about four and one-half hours until a reaction temperature of about 175° C. and a pressure of about 2100 pounds per square inch of hydrogen were obtained. The reaction was completed after the heating had been continued for a further period of about one hour and when a temperature of about 230° C. and a final pressure of about 2000 pounds per square inch had been obtained. This pressure drop corresponded to the addition of 2 mols of hydrogen at the conditions stated. After cooling the bomb overnight, the contents thereof were discharged and filtered, and the hydrogenation product was a white solid consisting of long lustrous needles. This product, after recrystallization, had the following properties:

|  | M. P. | Per Cent C | Per Cent H |
|---|---|---|---|
| Found | °C.<br>136.8–137.5 | 80.97 | 12.91 |
| Calculated |  | 81.20 | 12.78 |

It is believed that the following formula illustrates the reaction product obtained in the above example:

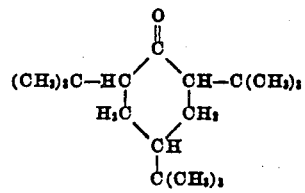

The compound of the present invention is advantageously employed as a chemical intermediate in the manufacture of pharmaceuticals, plasticizers, detergents and antioxidants for mineral oils.

The present application is in part a continuation of our prior application, Serial No. 596,419, filed May 28, 1945.

Thus we have described a new and useful compound herein specifically described and a process for preparing it.

What we claim is:

1. As a new product, a compound having the following structural formula:

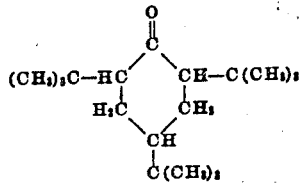

2. A method of converting 2,4,6-tri-tertiary-butyl phenol into 2,4,6-tri-tertiary-butyl cyclohexanone which comprises subjecting said phenol to a reaction pressure of hydrogen of from 1600 to 2500 pounds per square inch and to a temperature of from 160° to 250° C. in the presence of a hydrogenation catalyst and continuing the reaction until the addition of 4 atoms of hydrogen per molecule of said phenol is obtained.

3. A method of converting 2,4,6-tri-tertiary-butyl phenol into 2,4,6-tri-tertiary-butyl cyclohexanone which comprises subjecting 2,4,6-tri-tertiary-butyl phenol to an initial hydrogen pressure of about 1400 pounds per square inch in the presence of a nickel catalyst, heating and agitating the reactants until a reaction temperature of about 175° C. and a pressure of about 2100 pounds per square inch are obtained and continuing said heating until said reaction is completed at a temperature of about 230° C. and at a pressure of about 2100 pounds per square inch.

ARTHUR C. WHITAKER.
WILLIAM W. WEINRICH.

REFERENCES CITED

The following references are of record in the file of this patent:

UNITED STATES PATENTS

| Number | Name | Date |
|---|---|---|
| 2,087,691 | Lazier | July 20, 1937 |